Patented Aug. 14, 1945

2,381,971

UNITED STATES PATENT OFFICE 2,381,971

ANTHRAQUINONE DYESTUFFS

Henry Dreyfus, London, England, assignor to Celanese Corporation of America, a corporation of Delaware No Drawing. Original application October 19, 1937, Serial No. 232,796. Divided and this application May 30, 1942, Serial No. 445,197. In Great Britain October 19, 1937

6 Claims. (Cl. 260—376)

This invention relates to the manufacture of new anthraquinone dyestuffs and is a division of my co-pending application, S. No. 232,796 (now Patent No. 2,309,176).

The present invention comprises certain new dyestuffs, namely anthraquinone dyestuffs containing an hydroxyalkyl group esterified with an organic carboxylic acid radicle and includes the production of these novel dyestuffs, for example by any one of the following processes:

(a) By esterifying an anthraquinone dyestuff containing an hydroxyalkyl group, attached to an aromatic nucleus either directly or through a single atom which is an oxygen, sulphur or nitrogen atom, with an organic carboxylic acid esterifying agent, for example an organic carboxylic acid, acid anhydride or acid chloride.

(b) By reacting an anthraquinone dyestuff containing a reactive hydrogen atom contained in an amino group, an hydroxy group or a mercaptan group with a reagent containing both a reactive halogen atom and an hydroxyalkyl group esterified with an organic carboxylic acid radicle. For example, an anthraquinone derivative containing a primary or secondary amino group may be reacted with beta-chlorethyl acetate.

(c) By reacting an anthraquinone dyestuff containing a carboxylic acid or carboxylic acid halide group with a compound containing a hydroxy group and an hydroxyalkyl group esterified with an organic carboxylic acid radicle, e. g., glycol monoacetate.

(d) By reacting an anthraquinone dyestuff containing a reactive hydrogen atom with a halohydrin in the presence of a salt of an organic carboxylic acid.

The dyestuffs may contain more than one esterified hydroxyalkyl group. They contain auxochrome groups, for example nuclear amino, hydroxy or mercaptan groups, and the esterified hydroxyalkyl groups may be present in the auxochrome group. The term amino is employed in the present specification and claims, wherever the context will so permit, to denote both unsubstituted and substituted amino groups. Preferably the dyestuffs contain an amino group in the 1-position and preferably also contain an amino or hydroxy group in the 4-position. Alternatively, such groups may be substituted by esterified hydroxyalkyl groups, as, for example, in 1-acetoxyethylamino - 4 - amino - anthraquinone (produced by reacting 1:4-diamino-anthraquinone with the calculated quantity of chlorethyl acetate in the presence of sodium acetate), or by alkyl or aryl groups. If the esterified hydroxyalkyl groups in these dyestuffs are not attached at the 1- and/or 4-positions they are preferably in the 2- and/or 3-positions.

One class of anthraquinone dyestuffs included within the scope of the present invention are those obtained by introducing esterified hydroxyalkyl groups into anthraquinones containing cycloaliphatically substituted carboxylic acid amide groups and reactive hydrogen atoms contained in amino groups by reacting the anthraquinone derivatives with reagents containing reactive halogen atoms and hydroxyalkyl groups esterified with organic acid radicles. Such compounds, even when not containing esterified hydroxyalkyl groups, are dyestuffs for cellulose ester and ether materials. An example of such compounds is 1:4-diamino-anthraquinone-2-carboxylic acid cyclohexylamide, obtained by treating 1-amino-4-brom-anthraquinone-2-carboxylic acid cyclohexylamide with excess of ammonia at 120° C. It may be converted into a dyestuff according to the present invention by reaction with chlorethyl acetate in the presence of sodium acetate.

Whilst reference has been made above only to acetic esters of the hydroxyalkyl compounds, esters of other organic carboxylic acids may be formed. The invention is of greatest importance in connection with esters of aliphatic acids and particularly esters of the lower fatty acids, e. g., acetic acid, propionic acid and butyric acid. The alkyl group of the esterified hydroxyalkyl group may be, for example, an ethyl, propyl or butyl group.

The dyestuffs produced according to this invention have valuable dyeing properties for cellulose ether and ester materials. They are of the greatest importance in the colouration of cellulose acetate materials, but as examples of other esters and ethers of cellulose which may be coloured by means of them, reference may be made to cellulose formate, propionate and butyrate and to the ethyl, butyl and benzyl ethers of cellulose. The new dyestuffs may also be employed in the colouration of mixed materials comprising one or more of the aforesaid cellulose esters or ethers in admixture with other textile fibres, for example, wool, silk or other animal fibres, or cotton, regenerated cellulose or other cellulosic materials. Such other fibres may be coloured by the same dyestuffs as the cellulose esters or ethers when they possess the requisite affinity, or they may be coloured either in the same or different shades by means of other dyestuffs either before, after or simultaneously with the colouration of the cellulose esters or ethers.

The new dyestuffs may be applied to textile materials in solution where they are sufficiently soluble, in aqueous suspension or after being brought into colloidal form, and it is to be understood that the invention includes dyeing compositions which contain the dyestuffs in conjunction with dispersing agents and/or protective colloids.

The new dyestuffs may be applied to the materials from an aqueous bath or may be printed or stencilled on to the materials.

The following examples illustrate the invention but are not to be regarded as limiting it in any way:

Example I

An anthraquinone dyestuff containing an acetoxyethylamino grouping is obtained by refluxing finely divided 1-hydroxyethylamino-4-phenylamino-anthraquinone with the calculated quantity of acetic anhydride in glacial acetic acid for about 1-2 hours.

Example II

A dyestuff similar to that of Example I is obtained by refluxing about 20 parts by weight of 1-amino-4-phenylamino-anthraquinone, 10 parts of sodium acetate and 100 parts of ethylene chlorhydrin for about 6-10 hours.

Fabrics and other materials containing organic derivatives of cellulose may be coloured with either of the above dyestuffs applied for example, as an aqueous dispersion by dyeing, printing, or other method.

The invention includes, besides the dyestuffs themselves, the manufacture thereof by the processes described, compositions of matter containing the dyestuffs, the colouration of materials with the dyestuffs and the coloured materials so obtained. As previously indicated, the dyestuffs are of particular importance in the colouration of cellulose ether and cellulose ester materials. Dyestuffs containing a free hydroxyalkyl group as well as an esterified hydroxyalkyl group are especially valuable in this connection and these dyestuffs are the subject of my co-pending application, S. No. 232,796.

Having described my invention what I desire to secure by Letters Patent is:

1. Anthraquinone dyestuffs containing in the nucleus a hydroxy-alkyl amino group esterified with a lower alkyl mono-carboxylic acid, and another nuclear amino group.

2. Anthraquinone dyestuffs containing in the nucleus a hydroxy-alkyl amino group esterified with a lower alkyl mono-carboxylic acid and also a cyclo-aliphatically substituted carboxylic acid amide group.

3. Anthraquinone dyestuffs containing in the 1-position a hydroxy-alkyl amino group esterified with a lower alkyl mono-carboxylic acid, and in the 4-position an amino group.

4. Anthraquinone dyestuffs containing in the 1-position a hydroxy-alkyl amino group esterified with a lower alkyl mono-carboxylic acid, and in the 4-position an aryl-amino group.

5. Anthraquinone dyestuffs containing in the 1-position an acetoxyethylamino group and in the 4-position an amino group.

6. 1-acetoxyethylamino-4-phenylamino-anthraquinone.

HENRY DREYFUS.